United States Patent Office 3,071,590
Patented Jan. 1, 1963

3,071,590
CONDENSATION PRODUCTS OF FORMALDEHYDE, PRIMARY AMINES AND KETONES
George S. Gardner, Elkins Park, and Harry L. Faigen, Philadelphia, Pa., assignors to Amchem Products, Inc., Ambler, Pa., a corporation of Delaware
No Drawing. Filed Mar. 19, 1959, Ser. No. 800,378
6 Claims. (Cl. 260—309.6)

This invention relates to new condensation products of formaldehyde, primary amines and ketones and, more particularly, is concerned with the preparation of new compositions of matter and also with a process for preparing the same.

The compounds of this invention have the general formula:

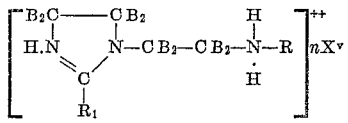

where B is selected from the group consisting of hydrogen and lower alkyl with the provision that at least six occurrences of B must be as H; $R_1$ is a saturated or unsaturated acid residue containing from 8 to 22 total carbon atoms; R is derived from the reaction of formaldehyde and a ketone having a replaceable hydrogen atom adjacent to the carbinyl group; X is an acid radical; selected from the group of acids having a dissociation constant of at least $10^{-3}$ and where $n$ and $v$ are integers from 1 to 2 inclusive with the provision that when $n$ is 1, $v$ must be 2 and vice versa in order to satisfy the valence of the imidazoline radical.

The compounds of this invention are prepared by a 2-step synthesis which initially involves the preparation of a primary imidazoline salt according to Equation I, and finally, the reaction of the imidazoline salt with formaldehyde and a ketone according to Equation II:

EQUATION I

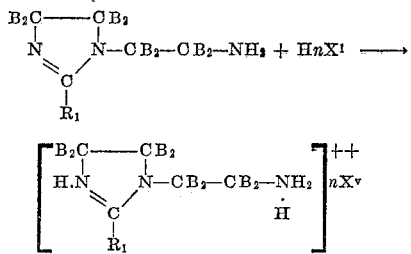

[1] Where $n$ is the valence of the acid radical X.

EQUATION II

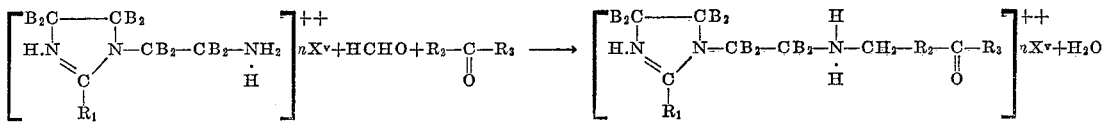

where B, $R_1$, X, $v$ and $n$ are as described above; $R_2$ is selected from the group consisting of methyl and methylene radicals with the provision that in the unreacted ketone $R_2$ is methyl unless the ketone is cyclic in which case it is a methylene group and $R_3$ is selected from the class consisting of alkyl, aryl, arylalkyl and heterocyclic groups and when taken together $R_2$ and $R_3$ constitute divalent, organic residues from alicyclic rings, said residues containing not more than 5 carbon atoms.

The primary amine salts suitable for use as starting materials in the manufacture of the compounds of this invention are prepared by adding two equivalents of an acid to one equivalent of a condensation product resulting from the reaction of a fatty or naphthenic acid with an aliphatic diamine to form an imidazoline. Although the preparation of the imidazoline forms no part of the present invention, we have found that the products formed by the reaction of a polyethylene polyamine such, for example, as diethylene triamine with a saturated or unsaturated fatty or naphthenic acid such as oleic, palmitic or mixtures of these acids, are ideally suitable for use in preparing the new compounds of this invention.

In general we have found that the saturated or unsaturated aliphatic acids, or mixtures thereof, containing from 8 to 22 total carbon atoms are ideally suitable for use in preparing the substituted imidazoline as described above. A typical example of mixed aliphatic acids is sold under the trade name "Pamak 1" by Hercules Powder Company. This material is reputed to consist of mixed saturated and unsaturated fatty acids consisting primarily of lineolic acid (46%) and oleic acid (52.5%) and 1.5% saturated acids. Other commercially available sources of saturated or unsaturated acids falling within the preferred purview of the present invention are those naphthenic acids such as are sold under the trade name "Sunaptic Acids, grades A and B" (Sun Oil Company). These acids are derived from petroleum and are considered to be mixtures of naphthenic compounds which have molecular weights ranging from 290–330 and which have average molecular formulas ranging from $C_{19-21}H_{34-37}O_2$.

The acids which have been found suitable for use in the process of this invention may be selected from the class consisting of hydrochloric, hydrobromic and sulfuric acids. In general acids having a dissociation constant of at least $10^{-3}$ are satisfactory for use in the process of the invention. It has been found that two equivalents of the acid must be used for each equivalent of substituted imidazoline in order to neutralize two nitrogen atoms of the imidazoline molecule as shown in Equation I, above.

The imidazoline salt obtained as the product of Equation I is reacted with formaldehyde and a ketone as shown in Equation II to yield the compounds of this invention. We have found that the most suitable method of preparing these new compositions of matter consists of reacting one mol equivalent of a substituted primary imidazoline salt with a slight molar excess of both formaldehyde and a ketone. The desired reaction products readily form by simply allowing a solution of the reactants to stand at average room temperature for about 24 hours to about 3 days. However, if desired, the condensation reaction may be completed in considerably shorter periods of time by gently warming the reactants over a steam bath.

The ketones which we have found to be suitable for use in the process of this invention are those having a replaceable hydrogen atom adjacent the carbonyl group, and are selected from the class of ketones consisting of (1) methyl-alkyl ketones such as represented by the formula $CH_3COC_nH_{2n+1}$ where $n$ is an integer from 1 to 19 inclusive and where the alkyl radical may be straight or branched chain, (2) methyl aryl and methyl arylalkyl ketones such as acetophenone, methyl benzyl ketone and methyl diphenylyl ketone, and (3) alicyclic and heterocyclic ketones containing five or six membered rings such for example, as cyclopentanone, cyclohexanone and methyl thienyl ketone.

The condensation reaction, when prepared in accordance with the above description will contain the products of the present invention in the form of their salts. These salts are generally water soluble and substantially oil insoluble, and find utility as surface active, emulsifying and corrosion inhibition agents without need of further purification or modification when used in aqueous media.

Typical examples of compounds which may be prepared by the process of this invention are listed below by way of illustration but are in no way intended to limit the scope of this invention:

*Example 1*

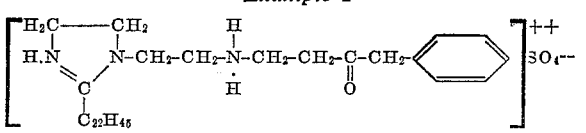

2-docosanyl,1-(N-4-phenyl,butanone-3)-aminoethyl imidazoline sulfate

*Example 2*

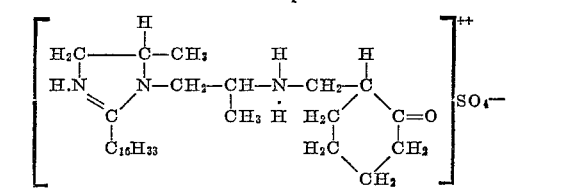

5-methyl,2-hexadecyl,1-(N-α-methyl cyclohexanone)-aminoisopropyl imidazoline sulfate

*Example 3*

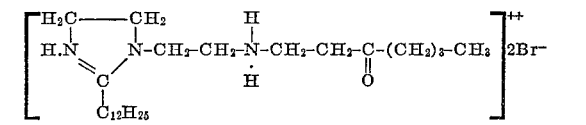

2-dodecyl, 1-(N-heptanone-3)-aminoethyl imidazoline dihydrobromide

*Example 4*

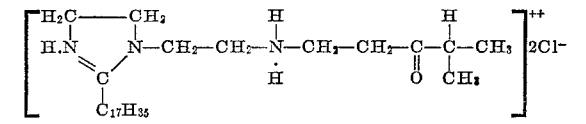

2-heptadecyl, 1-(N-4-methyl, pentanone-3)-aminoethyl imidazoline dihydrochloride

*Example 5*

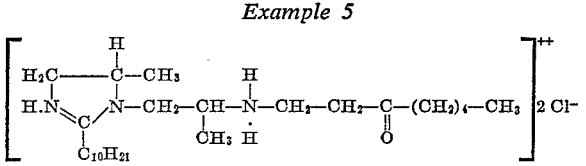

5-methyl, 2-decyl, 1-(N-octanone-3)-aminoisopropyl imidazoline dihydrochloride

*Example 6*

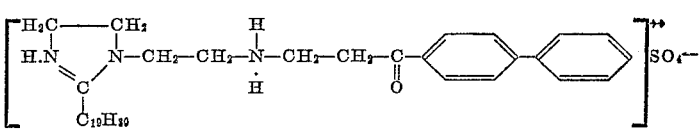

2-nonadecyl, 1-(N-diphenylyl-3, propanone-3)-aminoethyl imidazoline sulfate

*Example 7*

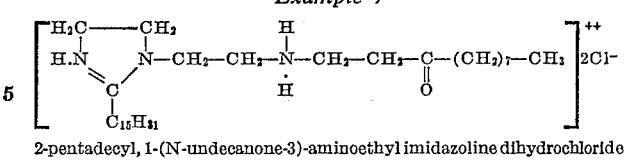

2-pentadecyl, 1-(N-undecanone-3)-aminoethyl imidazoline dihydrochloride

*Example 8*

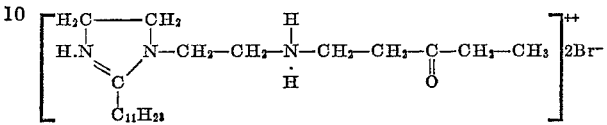

2-undecyl,1-(N-pentanone-3)-aminoethyl imidazoline dihydrobromide

*Example 9*

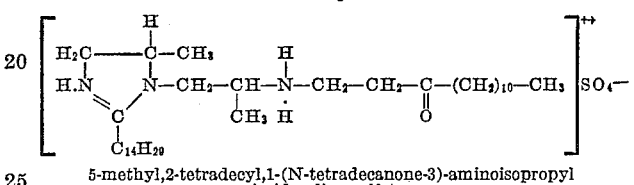

5-methyl,2-tetradecyl,1-(N-tetradecanone-3)-aminoisopropyl imidazoline sulfate

*Example 10*

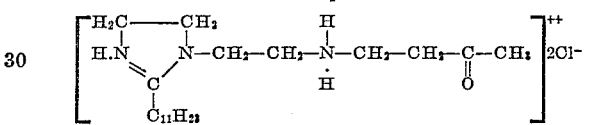

2-undecyl,1-(N-butanone-3)-aminoethyl-imidazoline dihydrochloride

*Example 11*

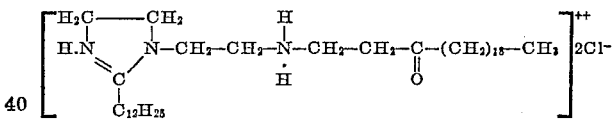

2-dodecyl,1-(N-docosanone-3)-aminoethyl imidazoline dihydrochloride

*Example 12*

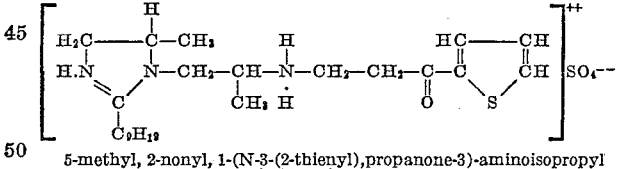

5-methyl, 2-nonyl, 1-(N-3-(2-thienyl),propanone-3)-aminoisopropyl imidazoline sulfate

*Example 13*

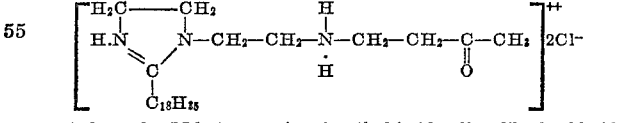

2-octadecenyl,1-(N-butanone-3)-aminoethyl imidazoline dihydrochloride

*Example 14*

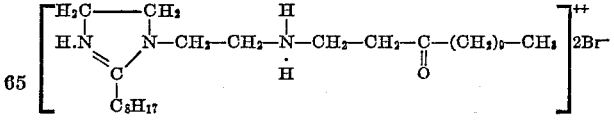

2-octyl,1-(N-tridecanone-3)-aminoethyl imidazoline dihydrobromide

Example 15

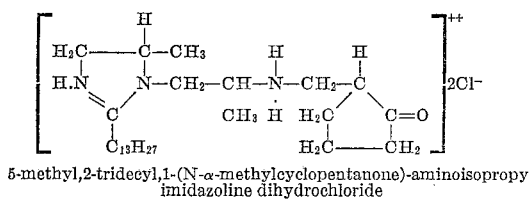

5-methyl,2-tridecyl,1-(N-α-methylcyclopentanone)-aminoisopropyl imidazoline dihydrochloride

Example 16

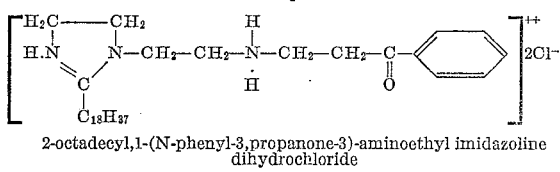

2-octadecyl,1-(N-phenyl-3,propanone-3)-aminoethyl imidazoline dihydrochloride

Specific examples of the preparation of compounds falling under the purview of this invention are listed below by way of illustration but are in no way intended to limit the scope of this invention.

Example 17

0.1 mol of the substituted imidazoline prepared by the reaction of diethylene triamine with lauric acid is mixed with 25 mls. of isopropyl alcohol which is added for solvency purposes. This solution is then added to 0.2 mol (20 mls. of 20° Bé.) of hydrochloric acid to form the primary imidazoline dihydrochloride salt. To this salt solution is added 0.13 mol of aqueous 37% formaldehyde solution and 0.13 mol of acetone. The reaction mixture is allowed to stand at ambient temperature (about 25° C.) for 1 day. After about 24 hours the reaction cycle was considered to be completed and the entire reaction mixture was diluted with water to yield a final inhibitor solution containing approximately 41 grams of product in 150 mls. of solution.

A portion of the crude product resulting from Example 17 was purified by evaporating a sample of the aqueous solution to dryness over a steam bath. The dried residue was then dissolved in acetone and filtered hot to remove unreacted primary imidazoline salt. Upon cooling a product separated from the filtrate. This precipitate was recovered and reprecipitated from acetone. Analysis of the purified 2-undecyl,1-(N-butanone-3)-aminoethyl imidazoline dihydrochloride after filtration and vacuum drying was as follows:

|  | Nitrogen | Chlorine | Molecular Weight (On chlorine) |
|---|---|---|---|
| Found, percent | 10.1 | 17.3 | 410 |
| Theoretical, percent | 10.25 | 17.3 | 410 |

Example 18

0.1 mol of the substituted imidazoline prepared by the reaction of diethylene triamine with palmitic acid is mixed in 25 mls. of isopropyl alcohol. This solution is then added to 0.2 mol of hydrochloric acid (20 mls. of 20° Bé.) to form the primary amine dihydrochloride salt. 0.13 mol of aqueous 37% formaldehyde solution and 0.13 mol of acetone are added to the salt and the reaction mixture is allowed to stand at ambient temperature (about 25° C.) with continuous stirring for 3 days. After completion of the reaction cycle the product remained in solution and was diluted with water to yield a final inhibitor solution containing approximately 47 grams of crude 2-pentadecyl, 1-(N-butanone-3)-aminoethyl imidazoline dihydrochloride in 150 mls. of solution.

A portion of the crude product resulting from Example 18 was purified according to the procedure outlined under Example 17 above. Analyses resulting from the purified 2-pentadecyl,1-(N-butanone-3)-aminoethyl imidazoline dihydrochloride were as follows:

|  | Nitrogen | Chlorine | Molecular Weight (On chlorine) |
|---|---|---|---|
| Found, percent | 8.84 | 15.2 | 466 |
| Theoretical, percent | 9.02 | 15.2 | 466 |

Example 19

0.1 mol of an imidazoline prepared from the reaction of oleic acid with diethylene triamine is added to 0.2 mol of hydrochloric acid (20 mls. of 20° Bé.). To the primary amine dihydrochloride is added 0.13 mol of aqueous 37% formaldehyde solution and 0.13 mol of acetone. The reaction mixture is warmed over a steam bath with agitation for 4.5 hours. Upon completion of the reaction the entire product is diluted with water to yield a final solution containing approximately 49 grams of crude inhibitor in 150 mls. of solution.

A sample of the crude product resulting from this reaction was purified as described under Example 17 above. Resulting analyses from the purified 2-heptadecenyl,1-(N-butanone-3)-aminoethyl imidazoline dihydrochloride were as follows:

|  | Nitrogen | Chlorine | Molecular Weight (On chlorine) |
|---|---|---|---|
| Found, percent | 8.68 | 14.4 | 492 |
| Theoretical, percent | 8.56 | 14.4 | 492 |

Example 20

0.1 mol of an imidazoline prepared from the reaction of oleic acid with dipropylene triamine is admixed with 25 mls. of isopropyl alcohol. This solution is then added to 0.2 mol of hydrochloric acid (20 mls. of 20° Bé.). 0.13 mol of aqueous 37% formaldehyde solution and 0.13 mol of acetone are then added to the primary amine dihydrochloride. The solution was gently heated with agitation to reflux and held in this condition for 3.5 hours. Upon completion of the reaction cycle the product was dissolved in water to yield a final solution containing approximately 52 grams of crude inhibitor in 157 mls. of solution.

A sample of the crude product resulting from this reaction was subjected to the purification technique as described under Example 17. The purified inhibitor analyzed as follows:

|  | Nitrogen | Chlorine | Molecular Weight (On chlorine) |
|---|---|---|---|
| Found, percent | 8.60 | 14.2 | 500 |
| Theoretical, percent | 8.08 | 13.7 | 520 |

Example 21

A sample of Sunaptic Acids A, de-oiled by the Sun Oil Co. by solvent extraction, was vacuum distilled with the fraction boiling between 173° and 210° C. at 1 mm. Hg being recovered. 132 g. of the distillate was admixed with 75 ml. of diethylenetriamine and 50 mls. benzene. This mixture was heated gently to reflux (150° C. max.) and held at this temperature for 24 hours with continuous water removal. The resulting product was vacuum distilled (1 mm. Hg) to recover the 2-imidazoline of mixed naphthenic acids.

42 grams of the distillate was dissolved in 25 ml. of isopropyl alcohol and was then added to 20 ml. of 20° Bé. hydrochloric acid to form the primary amine dihydrochloride salt. To this salt was added 10 mls. of aqueous 37% formaldehyde solution and 10 ml. of acetone. This mixture was heated gently to reflux and held in this condition for a total of 15 hours with continuous agitation. Upon completion of the reaction cycle, the product was diluted with sufficient water to yield a final inhibitor solution containing approximately 45 grams of product in 150 mls. of solution.

Partial purification of a sample of the product resulting from Example 21 was accomplished according to the procedure as described under Example 17. The partially purified product was dried in vacuum at the boiling point of C Cl₄. Analyses were as follows:

|  | Nitrogen | Chlorine |
|---|---|---|
| Found, percent | 9.45 | 17.4 |

Example 22

0.1 mol of the substituted imidazoline prepared by the reaction of diethylene triamine and lauric acid was admixed with 25 mls. of isopropyl alcohol. This solution was then added to 0.2 mol (20 ccs.) of 20° Bé. hydrochloric acid with cooling to form the primary amine dihydrochloride salt. To this admixture was added 0.13 mol of aqueous 37% formaldehyde solution and 0.13 mol of acetophenone. The reaction mixture was gently heated to 100° C. and held at this temperature range for 1.5 hours with agitation. Upon completion of the reaction the product was diluted with sufficient water to yield a final inhibitor solution containing approximately 47 grams of crude 2-undecyl, 1-(N-phenyl-3,propanone-3)-aminoethyl imidazoline dihydrochloride in 150 mls. of solution.

A portion of the crude 2-undecyl,1-(N-phenyl-3,propanone-3)-aminoethyl imidazoline dihydrochloride prepared in Example 22 was purified as described above, with the recovered product analyzing as follows:

|  | Nitrogen | Chlorine | Molecular Weight | |
|---|---|---|---|---|
|  |  |  | On Chlorine | On Nitrogen |
| Found, percent | 8.91 | 14.4 | 493 | 472 |
| Theoretical, percent | 8.90 | 15.0 | 472 | 472 |

Example 23

0.1 mol of the substituted imidazoline prepared from the reaction of diethylene triamine and palmitic acid was dissolved in 25 mls. of isopropyl alcohol. This solution was then added with cooling to 0.2 mol (20 ccs.) of 20° Bé. hydrochloric acid to form the corresponding primary amine dihydrochloride salt. 0.13 mol of aqueous 37% formaldehyde solution and 0.13 mol of methyl ethyl ketone were added to the reaction mixture, and the solution was allowed to remain at ambient temperature (about 25° C.) for 16 hours with continuous agitation. After the 16 hour reaction cycle had been completed, the crude product was dissolved in sufficient water to yield a final inhibitor solution containing approximately 48 grams of crude 2-pentadecyl,1-(N-pentanone-3) - aminoethyl imidazoline dihydrochloride in 150 mls. of solution.

A portion of the crude inhibitor resulting from Example 23 was subjected to the purification procedure described under Example 17. The purified 2-pentadecyl,1-(N-pentanone-3)-aminoethyl imidazoline dihydrochloride analyzed as follows:

|  | Nitrogen | Chlorine | Molecular Weight | |
|---|---|---|---|---|
|  |  |  | On Chlorine | On Nitrogen |
| Found, percent | 8.62 | 15.7 | 453 | 488 |
| Theoretical, percent | 8.76 | 14.8 | 480 | 480 |

Example 24

0.1 mol of the substituted imidazoline prepared from the reaction of palmitic acid and diethylene triamine was dissolved in 25 mls. of isopropyl alcohol. This solution was then added to 0.2 mol (20 ccs.) of 20° Bé. hydrochloric acid at a slow rate with cooling to form the primary amine dihydrochloride salt. To this admixture was added 0.13 mol of aqueous 37% formaldehyde solution and 0.13 mol of cyclohexanone. The reaction mixture was heated to 100° C. and held at this temperature with continuous stirring for twenty minutes. After the reaction cycle the crude product was dissolved in additional water to yield a solution containing approximately 51 grams of inhibitor in 150 mls. of solution.

A sample of the crude 2-pentadecyl,1-(N-α-methylcyclohexanone)-aminoethyl imidazoline dihydrochloride was purified according to the method noted above. Resulting analyses were as follows:

|  | Nitrogen | Chlorine | Molecular Weight (on Chlorine) |
|---|---|---|---|
| Found, percent | 7.93 | 13.08 | 544 |
| Theoretical, percent | 8.32 | 14.03 | 506 |

Example 25

36 grams of substituted imidazoline prepared by the reaction of diethylene triamine with a commercial grade of mixed fatty acids sold under the tradename "Pamak 1" were admixed with 25 mls. of isopropyl alcohol. This solution was then added to 20 ccs. of 20° Bé. hydrochloric acid with cooling to form the primary amine dihydrochloride salt. To this admixture was then added 10 ccs. of aqueous 37% formaldehyde solution and 10 ccs. of acetone. The reaction mixture was allowed to stand at a temperature ranging from 25–30° C. for sixteen hours. Upon completion of the reaction the product was diluted with sufficient water to yield a final inhibitor solution containing approximately 51 grams of product in 150 mls. of solution.

Inhibitor solutions prepared as described in Examples 17 to 25, inclusive were tested for corrosion inhibiting values according to the procedure of Gardner, Faigen, Gibson and Hall, Journal of the Franklin Institute, Volume 262, No. 5, pages 369–384 (1956). This test consists of immersing a ½" x 7" x 0.030" SAE 1010 type metal strip into a solution containing 30 cc. washed mineral spirits, 30 cc. of 4% aqueous sodium chloride solution and 1000 parts per million of hydrogen sulfide (calculated on the brine volume). The testing temperature is 40° C. and is continued for 24 hours. Inhibitor solution was added to the corrosive brine in amounts to yield a final concentration of 50 parts per million of the brine. Results of these tests are reported in Table I and corrosion values are expressed in terms of mg. of weight loss of the test strip.

TABLE I

| Inhibitor solution from Example No.: | Corrosion, mg. weight loss |
|---|---|
| Control | 48.0 |
| 17 | 7.3 |
| 18 | 5.4 |
| 19 | 4.6 |
| 20 | 4.9 |
| 21 | 6.3 |
| 22 | 4.8 |
| 23 | 3.8 |
| 24 | 3.3 |
| 25 | 4.4 |

As noted above the compounds of this invention are water soluble and substantially oil insoluble, and find use as exceptionally effective corrosion inhibition agents when employed in aqueous media. However, if it is desirable to obtain corrosion inhibitors which are oil soluble and substantially water insoluble, it is only necessary to convert the imidazoline salts of this invention to their corresponding free bases.

Various methods may be employed to accomplish this conversion. For example, the inorganic salts resulting from these reactions may be treated by careful neutralization in the cold with a dilute base such as sodium or ammonium hydroxide or sodium carbonate solutions. However, the preferred method of converting these salts to their free bases consists of passing an isopropyl alcohol solution of the salt through a column containing a strong base quaternary ammonium type anion exchange resin. We have found that Amberlite IRA 401, which is a resin of this type as sold by the Rohm and Haas Company, if pretreated with dilute caustic solution, will readily convert these salts to their free bases. Recovery of the base is readily accomplished by evaporating the solution and drying the product in vacuum.

In order to demonstrate this conversion technique, a sample of 2-undecyl,1-(N-butanone-3)-aminoethyl imidazoline dihydrochloride as per Example 10 was dissolved in 100 mls. of 90% isopropyl alcohol. A 100 ml. capacity column containing 60 grams of Amberlite IRA-401 was washed successively with 8-bed volumes of 4% sodium hydroxide solution, 8-bed volumes of distilled water, and 1-bed volume of isopropyl alcohol. The alcoholic solution containing the dihydrochloride salt of the inhibitor was then passed through the column, recovered, solvent evaporated and dried under vacuum. Analysis of the recovered product was as follows:

|  | Nitrogen | Chlorine |
| --- | --- | --- |
| Found, percent | 12.1 | nil |
| Theoretical, percent | 12.48 | none |

We claim:
1. A compound of the formula:

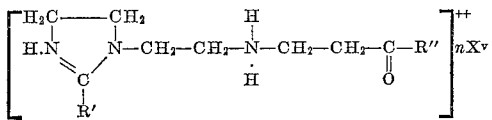

wherein R' is selected from the class consisting of alkyl and alkenyl of 8 to 22 total carbon atoms, R'' is selected from the group consisting of alkyl of from 1 to 19 carbon atoms, phenyl, benzyl, biphenyl and thienyl; X is an acid radical selected from the group consisting of Cl, SO$_4$ and Br; $n$ is an integer from 1 to 2 inclusive, and $v$ is an integer inverse to that of $n$ whereby to satisfy the valence of the imidazoline radical.

2. 2-heptadecenyl-1-(N-butanone-3)-aminoethyl imidazoline dihydrochloride having the formula:

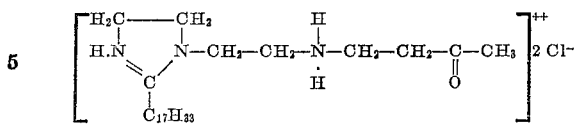

3. 5-methyl-2-hexadecyl-1-(N-alpha-methyl-cyclohexanone)-aminoisopropyl imidazoline sulfate having the formula:

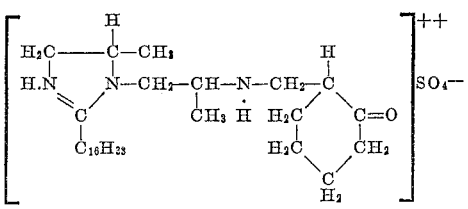

4. 2-heptadecyl-1-(N-4-methyl, pentanone-3)-aminoethyl imidazoline dihydrochloride having the formula:

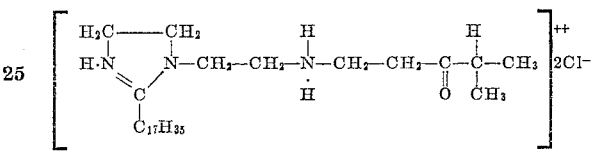

5. 2-undecyl-1-(N-butanone-3)-aminoethyl imidazoline dihydrochloride having the formula:

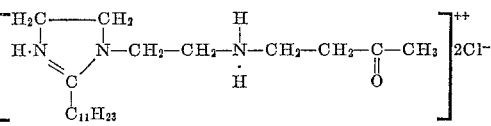

6. 2-undecyl-1-(N-phenyl-3, propanone-3)-aminoethyl imidazoline dihydrochloride having the formula:

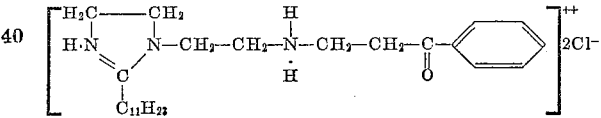

References Cited in the file of this patent
UNITED STATES PATENTS

| 2,485,309 | Nunn | Oct. 18, 1949 |
| 2,514,508 | Nunn | July 11, 1950 |
| 2,794,808 | Albrecht et al. | June 4, 1957 |
| 2,875,210 | Bollenback et al. | Feb. 24, 1959 |

UNITED STATES PATENT OFFICE
CERTIFICATE OF CORRECTION

Patent No. 3,071,590            January 1, 1963

George S. Gardner et al.

It is hereby certified that error appears in the above numbered patent requiring correction and that the said Letters Patent should read as corrected below.

Column 1, line 43, for "$HnX^1$" read -- $HnX^{(1)}$ --; line 52, for the footnote "1" read -- (1) --.

Signed and sealed this 6th day of August 1963.

(SEAL)
Attest:

ERNEST W. SWIDER            DAVID L. LADD
Attesting Officer            Commissioner of Patents